(12) United States Patent
Johnson et al.

(10) Patent No.: US 6,460,350 B2
(45) Date of Patent: Oct. 8, 2002

(54) VAPOR RECOVERY SYSTEM USING TURBOEXPANDER-DRIVEN COMPRESSOR

(75) Inventors: Paul C. Johnson, Boston; Fred E. Staible, Cambridge, both of MA (US)

(73) Assignee: Tractebel LNG North America LLC, Boston, MA (US)

( * ) Notice: Subject to any disclaimer, the term of this patent is extended or adjusted under 35 U.S.C. 154(b) by 0 days.

(21) Appl. No.: 09/774,461

(22) Filed: Jan. 31, 2001

(65) Prior Publication Data

US 2001/0042376 A1 Nov. 22, 2001

Related U.S. Application Data

(60) Provisional application No. 60/179,760, filed on Feb. 3, 2000.

(51) Int. Cl.[7] .............................. F17C 7/04; F12C 9/02
(52) U.S. Cl. .......................................... 62/48.1; 62/50.2
(58) Field of Search ................................ 62/48.1, 48.2, 62/48.3, 50.3, 50.2, 87

(56) References Cited

U.S. PATENT DOCUMENTS

| | | | |
|---|---|---|---|
| 3,768,271 A | 10/1973 | Denis | 62/55 |
| 3,857,245 A | * 12/1974 | Jones | 60/651 |
| 3,857,251 A | * 12/1974 | Alleaume | 62/48.3 |
| 3,919,852 A | * 11/1975 | Jones | 62/48.2 |
| 4,456,459 A | 6/1984 | Brundige, Jr. | 62/9 |
| 4,548,629 A | 10/1985 | Chiu | 62/17 |
| 4,716,737 A | 1/1988 | Mandrin | 62/52 |
| 4,923,492 A | 5/1990 | Hewitt | 62/11 |
| 4,970,867 A | 11/1990 | Herron et al. | 62/11 |
| 5,006,138 A | 4/1991 | Hewitt | 62/18 |
| 5,129,599 A | * 7/1992 | Wollen | 244/135 R |
| 5,566,555 A | 10/1996 | Hewitt | 62/623 |
| 5,615,561 A | 4/1997 | Houshmand et al. | 62/611 |
| 5,649,425 A | 7/1997 | Matsumura et al. | 60/648 |
| 5,682,766 A | 11/1997 | Bonaquist et al. | 62/646 |
| 5,755,114 A | 5/1998 | Foglietta | 62/618 |
| 5,950,453 A | 9/1999 | Bowen et al. | 62/612 |
| 5,992,175 A | 11/1999 | Yao et al. | 62/621 |
| 6,007,699 A | 12/1999 | Cole | 208/134 |

OTHER PUBLICATIONS

International Searh Report, PCT/US 01/03033, mailed May 21, 2001.

* cited by examiner

*Primary Examiner*—William C. Doerrler
(74) *Attorney, Agent, or Firm*—Kilyk & Bowersox, P.L.L.C.

(57) ABSTRACT

A method for recovering gas is described and includes compressing gas with a turboexpander-driven compressor. The compressor may be a high speed cryogenic centrifugal compressor and the gas to be recovered may be generated from a source of liquefied gas, such as during the transfer of liquefied natural gas from a shipping vessel to a storage tank. A system for recovering gas is also provided and includes a turboexpander-driven compressor in communication with a source of gas to be compressed. The system may be provided with a circuit such that at least a portion of the compressed gas, and/or at least a portion of an expanded, reduced-pressure gas exiting the turboexpander, is directed to the source of the gas.

38 Claims, 1 Drawing Sheet

VAPOR RECOVERY SYSTEM USING TURBOEXPANDER-DRIVEN COMPRESSOR

CROSS REFERENCE TO RELATED APPLICATION

This application claims the benefit under 35 U.S.C. §119 (e) of prior U.S. Provisional Application No. 60/179,760 filed Feb. 3, 2000, which is incorporated herein in its entirety by reference.

BACKGROUND OF THE INVENTION

The present invention relates to a vapor recovery system for recovering gas that evolves from a source of liquefied gas.

When liquefied gas such as liquefied natural gas is stored in bulk, it is generally stored in very large, highly insulated tanks at very low temperatures and at slightly higher than atmospheric pressure. Heat transfer through the insulation, and heat generated from various processes, causes the liquefied gas to boil or vaporize raising the pressure within the storage tank. The gas is generally removed and recovered by a small boil-off compressor to maintain a relatively constant pressure in the storage tank.

When a large vessel such as a ship unloads liquefied gas into a storage tank, the vaporization rate of the liquefied gas is much greater than under normal storage conditions. Large vapor recovery apparatuses in such systems have also been employed. However, economics often do not justify the cost of increasing the storage tank pressure or installing a large vapor recovery system to handle the high vaporization rates involved with large transfer processes such as a ship unloading process. Such a system would be expensive to install and would be used only during an unloading procedure. Depending upon the frequency of liquefied gas transfer procedures and the value of the vapor recovered, a need has arisen for a system for vapor recovery that has both low investment cost and low operating cost.

It is a feature of the present invention to provide a vapor recovery system for recovering gas evolved from a liquefied gas source, which preferably has low investment cost and low operating cost.

SUMMARY OF THE INVENTION

The present invention relates to a method for recovering gas that evolves from a source of liquefied gas. The method includes the steps of providing a source of liquefied gas from which gas evolves, and compressing the evolved gas with a compressor powered by a turboexpander. The compressor forms a source of compressed gas. The compressor is preferably a high speed cryogenic centrifugal compressor; however, other compressors could be used as well.

The present invention also provides a system for the recovery of gas. The system includes a container for a source of liquefied gas from which gas evolves, a compressor in communication with an outlet of the container wherein the outlet enables the withdrawal of gas from the container, and a turboexpander drivingly connected to the compressor for powering the compressor. Herein, the phrase "drivingly connected" refers to a connection between a turboexpander and a compressor whereby mechanical power from the turboexpander is transmitted to the compressor. The compressor is capable of increasing the pressure of withdrawn gas from the container and forming a source of compressed gas. The compressor includes a work shaft and the turboexpander also includes a work shaft drivingly connected to the work shaft of the compressor. In such an arrangement, power is transmitted from the work shaft of the turboexpander to the work shaft of the compressor.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

It is to be understood that both the foregoing general description and the following detailed description are exemplary and explanatory only and are intended to provide a further explanation of the present invention as claimed.

BRIEF DESCRIPTION OF THE DRAWING

The invention may be more fully understood with reference to the accompanying figure. The figure is intended to illustrate an exemplary embodiment of the present invention without limiting the scope of the invention.

DETAILED DESCRIPTION OF THE PRESENT INVENTION

Figure 1:
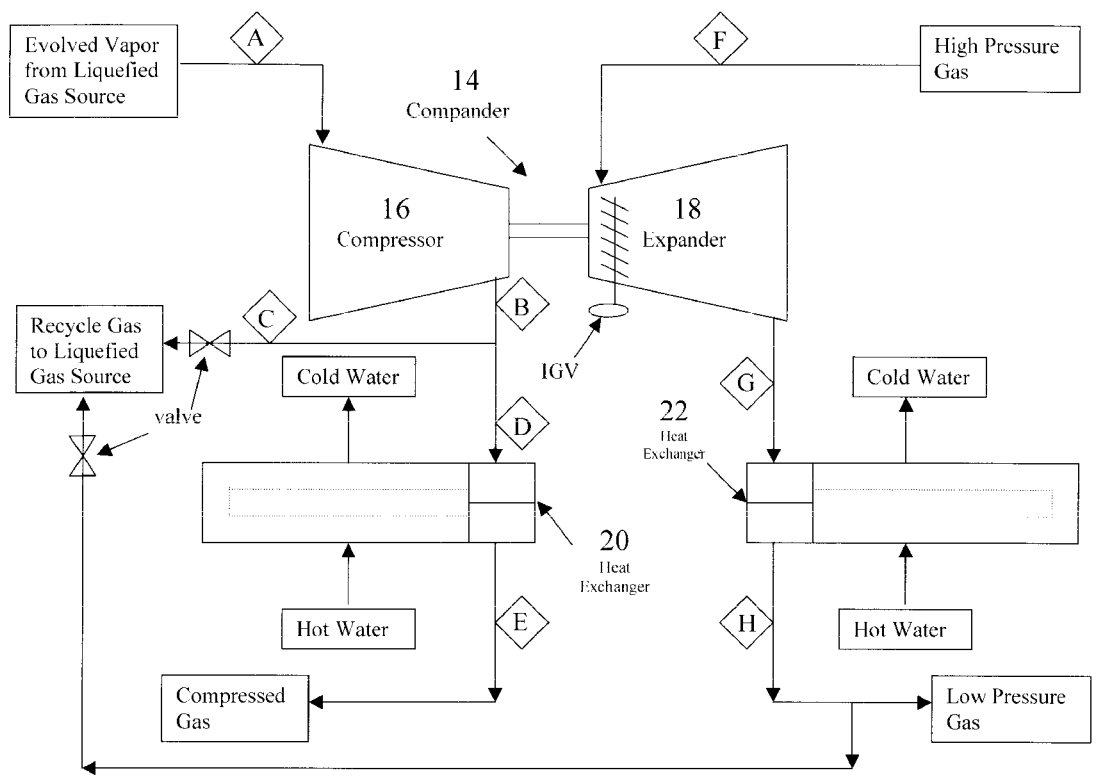
FIG. 1 is a schematic flow diagram showing a vapor recovery system according to an embodiment of the present invention.

The present invention relates to a method for recovering gas that evolves from a source of liquefied gas. The method includes the steps of providing a source of liquefied gas from which gas evolves, and compressing the gas with a compressor powered by a turboexpander. The compressor forms a source of useful compressed gas. The compressor is preferably a high speed cryogenic centrifugal compressor, although low speed cryogenic centrifugal and other compressors could be used.

The present invention also provides a system for the recovery of gas. The system includes a container for a source of liquefied gas from which gas evolves, a compressor in communication with an outlet of the container wherein the outlet enables the withdrawal of gas from the container, and a turboexpander drivingly connected to the compressor for powering the compressor. The compressor is capable of increasing the pressure of gas withdrawn from the container and forming a source of compressed gas.

The present invention can be useful with vapors from any liquefied gas, such as, but not limited to, methane, ethane, propane, butane, natural gas, ammonia, oxygen, argon, air, hydrogen, helium, nitrogen, chlorine, propylene, ethylene, and combinations thereof.

The various components of the system according to the present invention, including the turboexpander, compressor, storage container, pipelines, valves, fittings, and diverters can include suitable components used in conventional liquefied natural gas (LNG) systems. Exemplary components that can be used include the components described in U.S. Pat. Nos. 4,456,459; 4,548,629; 4,923,492; 4,970,867; 5,006,138; 5,566,555; 5,615,561; 5,649,425; 5,682,766; 5,755,114; 5,950,453; 5,992,175; and 6,007,699; which are all incorporated herein in their entireties by reference.

According to an embodiment of the present invention, the drive member of the compressor is preferably a work shaft and the drive member of the turboexpander is preferably a work shaft. A drive transmission may be provided for transmitting power from the turboexpander work shaft to the compressor work shaft to transmit a driving force from the turboexpander to the compressor.

The turboexpander is driven by a high pressure gas source. The high pressure gas source becomes reduced in pressure to a lower pressure gas source as a consequence of gas expansion that drives the turboexpander. The high pressure gas source can have a gas pressure of from about 100 pounds per square inch gage (psig) to about 1,000 psig, such as from about 500 psig to about 750 psig, and a temperature of from about −150° C. to about 300° C., more preferably from about 0° C. to about 200° C. The lower pressure gas source produced by the turboexpander may have a gas pressure of from about 5 psig to about 500 psig, such as from about 15 psig to about 250 psig, and a temperature of from about −150° C. to about 150° C., more preferably from about −50° C. to about 50° C.

According to the present invention, the source of compressed gas exits the compressor at a first pressure. The lower pressure gas source produced by the turboexpander has a second pressure, and the first and second pressures can be substantially the same or can be substantially different. The compressed gas and the lower pressure gas source can be combined to form a single gas stream, for example, a consumer gas stream. Herein, the phrase "consumer gas stream" refers to a gas stream having a pressure that renders the stream ready for commercial use. The consumer gas stream can have a pressure of from about 5 psig to about 250 psig, for example, from about 10 psig to about 30 psig, and a temperature of from about 0° C. to about 30° C. The gas and the lower pressure gas source can be the same type of gas; for example, both can be natural gas. If the gas stream from the turboexpander and the compressed gas are to be combined, then the type of gas should be the same or compatible.

The methods of the present invention can be used to compress a variety of gas types, including hydrocarbon gases such as methane, ethane, propane, butane, and combinations thereof, particularly natural gas. In addition, the methods are useful for processing other commercially valuable sources of gases evolved from liquefied oxygen, liquefied hydrogen, liquefied helium, liquefied chlorine, liquefied propylene, liquefied ammonia, liquefied ethylene, liquefied nitrogen, liquefied argon, liquefied air and the like.

According to some embodiments of the present invention, the compressed gas and the lower pressure gas source each has a pressure higher than typical consumer gas stream pressures. The pressures of the compressed gas and of the lower pressure gas source can both be in the range of from about 100 psig to about 300 psig, for example, about 200 psig. If the compressed gas and the lower pressure gas source are combined under such conditions, the pressure of one or both is preferably adjusted before being combined so that the pressures are substantially the same. Either or both of the compressed gas and the low pressure gas source can further be compressed or expanded to achieve a desired pressure. Either or both of the turboexpander and the compressor can be designed and/or operated to produce the same pressure as the other. At higher pressures, a combined stream could be useful as an industrial gas stream. The resulting combined industrial gas stream could be useful, for instance, for powering a power plant, or could instead be further expanded or pressure-reduced to produce other consumer gas streams. The gas exiting the turboexpander and/or the gas exiting the compressor can have any desired pressure to produce a commercially valuable source of gas. Knowing the desired pressure, the turboexpander and compressor can be designed and/or operated to achieve the desired pressure (s), and avoid any need to further adjust the pressure for use.

According to an embodiment of the present invention, the method can further include heating the gas from the high pressure gas source to a temperature of from about 20° C. to about 300° C., before using the high pressure gas source to drive the turboexpander. The compressed gas produced by the compressor can also be heated, for example, to from about −50° C. to about 100° C., to render the compressed gas more compatible with the gas it may be combined with and/or the system into which the compressed gas is transferred. If the method includes heating the gas from the high pressure gas source or heating the compressed gas, one or more suitable heaters can be used to affect the appropriate heating requirements.

According to some embodiments of the present invention, at least a portion of the compressed gas can be diverted by a suitable diverter or valved connection back to the source of liquefied gas, thereby increasing or maintaining the pressure of the source of liquefied gas. Instead, or in addition, at least a portion of the lower pressure gas source resulting from expansion in the turboexpander can be diverted to the source of liquefied gas to increase or maintain the pressure of the source of liquefied gas. The gas exiting the turboexpander and/or compressor can be used in conjunction with conventional by-pass and/or anti-surge systems to control pressure in the system.

The source of liquefied gas may be a storage container or any other container containing liquefied gas. The methods and systems of the present invention are especially useful in processing gas evolved in a storage container during, or at about the time of, transferring the liquefied gas from a shipping vessel to the storage container. Examples of shipping vessels include ships and railroad tanker cars. The methods and systems of the present invention can be used, however, in any situation or system where gas is evolved.

The system is preferably provided with a low-pressure system that can accept both the low-pressure gas exhausted from the turboexpander and the compressed gas produced by the compressor. The system to which the compressed gas is transferred and the system to which the exhausted turboexpander gas is transferred may be the same system or may be different systems. The sizes of the various components of the system or systems and their pressure and temperature capacities will be dependent upon the quantity and type of gas to be recovered, the pressure and quantity of high pressure gas available, and the pressure and capacity of the one or more low pressure system(s) that accept(s) the compressed gas from the compressor and/or the low-pressure exhaust gas from the turboexpander.

If a high pressure source of gas is not available, such a source can be developed by modifying other systems normally provided, for instance, at a receiving terminal. One modification would be to add a pump to increase the pressure of liquefied gas that is to be treated by the system, and a regasifier that can operate at the higher pressure. The work required to increase the pressure of a liquefied gas in a liquid state is substantially low, and a process that involves pumping a liquefied gas, regasifying it, and expanding the gas to drive a turboexpander is very efficient. If such a modification is required the system may then also include a pump to increase the liquefied gas pressure, a high pressure regasifier, and piping, metering devices, controls, and instrumentation required to complete the system. These components would be in addition to the turboexpander-driven compressor, the optional heater(s), and whatever other piping, metering devices, controls, and instrumentation are required to complete the basic system of the present invention. Optionally, the gas to be compressed can be heated by a suitable heating device before being compressed by the compressor.

A schematic diagram of an exemplary system according to the present invention is shown in the accompanying FIG. 1. As shown in FIG. 1, gas from a source of liquefied gas is fed or pulled through a pipeline or other communication to a compressor where it is compressed and fed through an outlet pipeline or other communication. The compressed gas stream in the output pipeline can be suitable for consumer use or industrial use, or it can be recirculated back to the source of liquefied gas. The compressor is connected to and driven by a turboexpander, preferably a turboexpander having a work shaft that extends from the turboexpander to the compressor. The turboexpander work shaft is drivingly connected to a work shaft or drive member of the compressor and a drive transmission means is provided to affect transfer of power from the turboexpander work shaft to the compressor work shaft or drive member. As also shown in FIG. 1, a high pressure gas source is fed by a pipeline to the turboexpander where it is expanded to produce a reduced pressure gas source and to provide the power needed to drive the turboexpander work shaft and thus the compressor. The reduced pressure gas source exiting or exhausted from the turboexpander is fed, as shown in FIG. 1, to a pipeline for transportation away from the turboexpander and for further consumer or industrial use, or is fed to the source of liquefied gas so as to maintain or increase the pressure of the source of liquefied gas. If optional heaters are provided, they may be employed along the pipeline leading from the high pressure gas source to the turboexpander, along the pipeline leading away from the turboexpander, and/or along the pipeline entering and/or exiting the compressor.

In an exemplary method of the present invention, a shipload of liquefied gas is unloaded at a receiving terminal into a storage tank. The ship unloading process generates 1,500,000 standard cubic feet per hour (scfh) of cold vapor. A pipeline which operates at 15 psig is available to accept 2,250,000 scfh. A source of high pressure gas is also available at 750,000 scfh and a pressure of 700 psig. Under such conditions, the present invention can be employed whereby 750,000 scfh of the high pressure gas is expanded in the turboexpander so as to be reduced in pressure from 700 psig to 15 psig and thus provide the shaft work required to drive the associated compressor. The compressor compresses 1,500,000 scfh of cold vapor from the storage tank to 15 psig. The cold compressed gas can then be combined with the cold expanded gas from the turboexpander and the combined stream can be heated to a condition specified by the 15 psig pipeline. Alternatively, if a high temperature heat source is available, the high pressure gas can be preheated before entering the turboexpander to increase the amount of work that can be extracted from each unit of mass, thereby reducing the amount of high pressure gas required. Because the compressed gas would still be quite cold, the unit can advantageously be slightly oversized such that a cold stream of compressed gas can be withdrawn to replace vapor in the ship holding tank. The use of a withdrawn cold stream of compressed gas would eliminate the need for a vapor return blower to replace vapor in the ship.

In another hypothetical example, a ship unloading process generates 1,500,000 scfh of cold vapor. A pipeline is provided which operates at 15 psig and can accept a maximum of 1,500,000 scfh. Another pipeline is available which operates at 200 psig and can accept another 1,500,000 scfh. In this hypothetical example, a source of high pressure gas is also available at 1,500,000 scfh and 700 psig. Under these conditions, the 1,500,000 scfh of high pressure gas can be expanded in the turboexpander to reduce the pressure thereof from 700 psig to 200 psig and thus provide the shaft work required to drive the compressor. The compressor compresses 1,500,000 scfh of cold vapor from the storage tank to 15 psig. The cold compressed gas is heated to a condition specified by the 15 psig pipeline, and the cold expanded gas is heated to a condition specified by the 200 psig pipeline. Under conditions wherein a high temperature source is available, the high pressure gas may be preheated before it enters the turboexpander, thus increasing the amount of work that can be extracted from each unit of mass and thereby reducing the amount of high pressure gas required. Because the compressed gas is still quite cold, it may be advantageous to slightly oversize the compressor unit and to withdraw a cold stream of compressed gas for vapor replacement in the ship. The withdrawn cold stream of compressed gas would eliminate the need for a vapor return blower as is typically used to replace lost vapor in a ship.

In yet another hypothetical example of a method according to the present invention, a process generates 1,500,000 scfh of cold vapor. A first pipeline is available that operates at 15 psig but cannot accept 1,500,000 scfh. A second pipeline is available that operates at 200 psig and can accept 6,000,000 scfh. In addition, a source of high pressure gas is available at 4,500,000 scfh and 700 psig. Under such conditions, the 4,500,000 scfh of high pressure gas can be expanded in the turboexpander to reduce the pressure of the gas from 700 psig to 200 psig and thereby provide the shaft work required to drive the compressor. The compressor compresses the 1,500,000 scfh of cold vapor from the storage tank to a pressure of 200 psig. The cold compressed gas is combined with the cold expanded gas and the combined stream is heated to a condition specified by the 200 psig pipeline. In circumstances where a high temperature heat source is available, the heat source may be used to preheat the high pressure gas before it enters the turboexpander, thereby increasing the amount of work that can be extracted from each unit of mass and reducing the amount of high pressure gas required.

As can be seen from the foregoing hypothetical examples, the present system and method can be useful under a variety of conditions and can be adapted to be employed in any system that generates gas, including, but not limited to, at a wide variety of receiving terminals.

The turboexpander-driven compressor used according to the methods and system of the present invention has advantages over electric motor-driven or fossil fuel fired engine-driven compressors that, unlike the turboexpander-driven compressor, require relatively large, low speed drivers and speed increaser gears to drive the compressors. The turboexpander-driven compressor used according to the present invention can have both the compressor and the driver on the same shaft and can operate at relatively higher speed, eliminating the need for a speed increaser gear and providing comparable power with a much smaller unit than would be required for a compressor driven by an electric motor or a fossil fuel fired engine or turbine. It is expected that the cost of a system utilizing a turboexpander-driven compressor would be less than a similar system driven by an electric motor or a fossil fuel fired engine or turbine.

The turboexpander-driven compressor used in the system of the present invention also provides clear advantages over other processes that do not include a turboexpander. The heat required to preheat or after-heat the motive gas used or exhausted by the turboexpander requires much less energy than that required to generate electricity for an electric motor, and uses less energy than that obtained by the fuel required for a fossil fuel fired engine or turbine. Even if a system according to the present invention requires that the source of liquefied gas be pumped to a higher pressure, the pump energy required is very low compared to the energy required in processes utilizing electric motors or fossil fuel driven engines.

Another advantage of using a turboexpander is that a turboexpander can be efficiently controlled to meet reduced power requirements. This allows for efficient control of the compressor within normal operating parameters. Under certain circumstances, the unit may be controllable to act as a boil-off compressor. The energy efficiency of a turboexpander-driven compressor remains very high under reduced power requirements, as opposed to the great reduction in energy efficiency that exists when a compressor is driven by an electric motor or driven by a fossil fuel fired engine.

The use of a turboexpander in the systems of the present invention also provides advantages in that turboexpanders can be operated at various speeds, enabling the precise control of the drive rate of the turboexpander and compressor, resulting in excellent control of process parameters including pressures.

In addition, the maintenance cost of a fossil fuel fired engine or turbine is much higher than that for a turboexpander because of the relatively higher temperatures and complexities associated with a combustion process.

The present invention will be further clarified by the following examples, which are intended to be purely exemplary of the present invention.

EXAMPLE

In the present Example, a computer simulation of a vapor recovery system was set up to maximize the recovery of vapor vented during the unloading of LNG carriers at a commercial terminal. The computer simulated system was designed to recover the vapor by compressing the vapor collected from two tank vents, warming the vapor, and sending the vapor to a commercial gas pipeline. A process flow diagram of the system is shown in FIG. 1. The system included a compander 14 that included a compressor 16 and an expander 18. As shown in FIG. 1, the designation IGV stands for inlet guide vanes.

Overall Process Flow

In the computer simulation, vapor from liquefied natural gas storage tanks (not shown) on a ship was gathered in a common vent header (not shown). A portion of the vapor from this header was returned to the ship (not shown in FIG. 1). The remaining gas, identified herein as stream A, flowed to a turboexpander-driven compressor suction. With the LNG storage tanks having a pressure operating at about 15.9 psia, the compressor suction pressure, that is, stream A in FIG. 1, was theoretically 15.23 psia. Table 1 describes the streams shown in FIG. 1.

The compressor 16 boosted the gas to a sufficient pressure to flow through a compressed vapor heat exchanger 20, and to the compressed gas system, that is, to a gas pipeline. At the discharge of the compressor 16 the pressure of the gas, stream B, was 48.87 psia. A portion of the compressed gas, stream B, was recycled to a liquefied gas source via stream C and the remainder, stream D, flowed to the compressed vapor heat exchanger 20. In the compressed vapor heat exchanger 20, the compressed vapor, stream D, was warmed from approximately −105° F. to 60° F., and exited as stream E. The compressor discharge temperature varied with the compressor discharge pressure required to flow into the commercial gas pipeline.

The compressor was driven by a directly coupled turboexpander which expanded a gas stream of 675 psia, stream F, to 235 psia, stream G. The flow through the compressor was varied by controlling the position of the inlet guide vanes (IGV) in the high-pressure inlet of the expander which varied the high pressure gas flow to the expander. The expander discharge gas stream, stream G, flowed through the expanded gas heat exchanger 22 to the low pressure gas system via stream H. In the expanded gas heat exchanger 20, the gas was warmed from approximately −40° F. to 60° F.

The compressed vapor and expanded gas heat exchangers in this example were heated with circulating hot water supplied at 80° F.

Design Cases

As mentioned above, the flow rate and composition to the compressor would not be constant during a ship unloading process. Once all the pumps are operating the flow would change slowly during the bulk of an unloading operation. The four design Cases discussed below cover an expected range of operation. For each case, the system was designed to recover vapor collected from two tanks.

Case A is the expected flow during the unloading of a ship with a sendout flow to a commercial gas line (recovered vapor) of 990,147 scfh, requiring a recycle flow of 430,382 scfh to avoid compressor surge.

Ship Vapor Pressure-16.4 psia, Unloading Rate-20,000 gpm

Sendout Flow to commercial gas line-990,147 scfh

Case B, another unloading case, involves the most common ship unloading scenario expected at the terminal from which the present testing simulations were hypothesized.

Ship Vapor Pressure-16.4 psia, Unloading Rate-30,000 gpm

Sendout Flow to commercial gas line-1,287,194 scfh

Case C sets the design flow for the compressor.

Ship Vapor Pressure-16.4 psia, Unloading Rate-36,500 gpm

Sendout Flow to commercial gas line-1,794,068 scfh

Case D, which involved the same condition as used in Case C but with a higher ship vapor pressure, represents a maximum expected flow through the compressor.

Ship Vapor Pressure-16.7 psia, Unloading Rate-36,500 gpm

Sendout Flow to commercial gas line-2,071,721 scfh

For each of the design cases, the tank pressures were 1.22 psig for Tank 1 and 1.16 psig for Tank 2. Conditions producing a flow higher than 2,071,721 scfh, such as higher ship vapor pressure combined with low atmospheric pressure, could be handled by reducing the unloading rate for a period of time.

Compressor System Design Considerations

The compressor was designed to compress a gas flow of 990,000 scfh to 2,072,000 scfh from an inlet pressure of from 0.2 to 0.7 psig to a discharge pressure of from 33 to 40 psig, sufficient to flow into the commercial gas pipeline at 30 psig for design cases A, B, and C, and at 22 psig for design Case D. The base design of the system was for a 22 psig maximum pipeline pressure. The maximum operating pressure of the pipeline could be increased to 30 psig or more, and the compressor was designed to meet this maximum demand. The compressor was also designed to operate down to a discharge pressure of 12 psig to allow for a commercial gas pipeline pressure as low as about 8 psig.

In order to handle the full range of flows the design of the expander was biased toward higher flows. This resulted in more recycle flow for the lower flow cases A and B. Also, the compressor outlet pressure was limited such that it would only get to the commercial gas pipeline at 22 psig for Case D. Over the range of operations down to 990,000 scfh, the compressor could make the full design discharge pressure requirement at a supplier sendout pressure of 30 psig. At 990,000 scfh, there is are cycle of 430,000 scfh bringing the suction temperature up from −235° F. to −182° F. At this temperature the compressor was still able to make the 33 psig discharge pressure sufficient to get into the commercial gas pipeline at 30 psig. In addition, at startup the compressor could take a 0° F. suction temperature flow of around 829,000 scfh and still make a 20 psig discharge pressure, sufficient to get into the commercial gas pipeline.

The net result of all these considerations is that the compander is capable of compressing the full range of flows, Cases A through D, to the commercial system.

Ship Unloading

The best sequence of starting up the compander will be determined by operations at the particular location. Sufficient controls are provided to allow a great deal of flexibility. It is expected that the compander will not be started until a flow of LNG from a ship to one or more tanks is begun and the pressure in the tank(s) rise above the normal operating pressure. The inlet guide vanes on the expander can be ramped open using a flow controller until the pressure in the one or more tanks falls to near the desired pressure. The position of the inlet guide vanes (IGV) can then be adjusted by the tank pressure control.

At the end of a loading cycle as the ship's pumps are stopped and the vapor flow drops off, the tank pressure controller can close off the IGV. As the compressor flow drops an anti-surge controller can open a bypass and the inlet will begin to warm up. The compander can be shut down when there is no flow to the commercial gas line, for example, a 30 psig line.

The flow rates, pressures, temperatures, and other properties of various vapor and liquid flows through the system in accordance with the embodiment of design case B, as generated by a process simulator, are shown in Table 1 below.

TABLE 1

| Stream ID | Units of Measure | A<br>Evolved Vapor from Liq. Gas Source | B<br>Compressor Discharge | C<br>Recycle Gas to Liq. Gas Source | D<br>Compressed Gas to Heater | E<br>Compressed Gas to Commercial Gas Pipeline | F<br>High Pressure Gas to Expander | G<br>Expander Discharge | H<br>Low Pressure Gas |
|---|---|---|---|---|---|---|---|---|---|
| Phase Conditions | | VAPOR | VAPOR | VAPOR | VAPOR | VAPOR | VAPOR | VAPOR | VAPOR |
| TOTAL WEIGHT FLOW | lb/hr | 65,892 | 65,892 | 11,292 | 54,600 | 54,600 | 95,000 | 95,000 | 95,000 |
| MOLECULAR WEIGHT | | 16.06 | 16.06 | 16.06 | 16.06 | 16.06 | 16.6879 | 16.6879 | 16.6879 |
| TEMPERATURE | deg F. | −219.17 | −105.38 | −105.46 | −105.48 | 60 | 60 | −41.79 | 60 |
| PRESSURE | psia | 15.23 | 48.87 | 48.29 | 48.12 | 46.62 | 675.00 | 235.00 | 228.91 |
| CRITICAL PRESSURE | psia | 666.96 | 666.96 | 666.96 | 666.96 | 666.96 | 668.25 | 668.25 | 668.25 |
| CRITICAL TEMPERATURE | deg F. | −116.82 | −116.82 | −116.82 | −116.82 | −116.82 | −107.80 | −107.80 | −107.80 |
| COMPOSITION MOLE PERCENTS | | | | | | | | | |
| Water | | 0.0000 | 0.0000 | 0.0000 | 0.0000 | 0.0000 | 0.0000 | 0.0000 | 0.0000 |
| Nitrogen | | 0.1342 | 0.1342 | 0.1342 | 0.1342 | 0.1342 | 0.0066 | 0.0066 | 0.0066 |
| Methane | | 99.8594 | 99.8594 | 99.8594 | 99.8594 | 99.8594 | 96.0354 | 96.0354 | 96.0354 |
| Ethane | | 0.0064 | 0.0064 | 0.0064 | 0.0064 | 0.0064 | 3.4202 | 3.4202 | 3.4202 |
| Propane | | 0.0000 | 0.0000 | 0.0000 | 0.0000 | 0.0000 | 0.4522 | 0.4522 | 0.4522 |
| i-Butane | | 0.0000 | 0.0000 | 0.0000 | 0.0000 | 0.0000 | 0.0412 | 0.0412 | 0.0412 |
| n-Butane | | 0.0000 | 0.0000 | 0.0000 | 0.0000 | 0.0000 | 0.0338 | 0.0338 | 0.0338 |
| I-Pentane | | 0.0000 | 0.0000 | 0.0000 | 0.0000 | 0.0000 | 0.0067 | 0.0067 | 0.0067 |
| n-Pentane | | 0.0000 | 0.0000 | 0.0000 | 0.0000 | 0.0000 | 0.0040 | 0.0040 | 0.0040 |
| VAPOR PHASE | | | | | | | | | |
| WEIGHT FLOW | lb/hr | 65,892 | 65,892 | 11,292 | 54,600 | 54,600 | 95,000 | 95,000 | 95,000 |
| MOLECULAR WEIGHT | | 16.06 | 16.06 | 16.06 | 16.06 | 16.06 | 16.6879 | 16.6879 | 16.6879 |
| VOLUMETRIC FLOW @ 14.73 psia, 60 F. | ft3/hr | 1,553,403 | 1,553,403 | 269,473 | 1,287,194 | 1,287,194 | 2,155,354 | 2,155,354 | 2,155,354 |
| ACTUAL VOLUMETRIC FLOW | ft3/hr | 680,055 | 310,965 | 53,944 | 261,724 | 403,567 | 41,775 | 99,465 | 133,130 |
| COMPRESSIBILITY FACTOR, Z | | 0.9782 | 0.9743 | 0.9746 | 0.9747 | 0.9924 | 0.8882 | 0.9156 | 0.9599 |
| K = Cp/Cv @ FLOW TEMPERATURE | | 1.3594 | 1.3636 | 1.3633 | 1.3632 | 1.315 | 1.505 | 1.4394 | 1.3562 |
| DENSITY @ PRESS, TEMP | lb/ft3 | 0.0969 | 0.2119 | 0.2093 | 0.2086 | 0.1353 | 2.2741 | 0.9551 | 0.7136 |
| VISCOSITY @ FLOW TEMPERATURE | cp | 5.19E-03 | 7.62E-03 | 7.62E-03 | 7.62E-03 | 1.07E-02 | 1.16E-02 | 9.10E-03 | 1.09E-02 |
| THERMAL CONDUCTIVITY | Btu/(hr-ft2-F.) | 8.70E-03 | 1.28E-02 | 1.28E-02 | 1.28E-02 | 1.97E-02 | 1.94E-02 | 1.50E-02 | 1.94E-02 |
| HEAT CAPACITY | Btu/(lb-F.) | 0.499 | 0.5069 | 0.5068 | 0.5067 | 0.5345 | 0.6135 | 0.543 | 0.5478 |

It will be apparent to those skilled in the art from the foregoing disclosure of the present invention and from the detailed description of certain preferred embodiments, that numerous modifications and alternative embodiments are possible within the true scope and spirit of the invention. The following claims and equivalents thereof are intended to cover the true scope and spirit of the invention.

What is claimed is:

1. A method for recovering gas evolved from a liquefied gas, said method comprising:

providing a source of liquefied gas from which gas evolves; and compressing gas that evolves from said source of liquefied gas with a compressor powered by a turboexpander to form a source of compressed gas wherein said turboexpander is driven by a gas that is different from said gas being compressed through said compressor.

2. The method of claim 1, wherein said compressor has a drive member, said turboexpander has a drive member, and a drive transmission means is provided for transmitting power from the turboexpander drive member to the compressor drive member to thereby drive the compressor.

3. The method of claim 1, wherein said turboexpander is driven by a high pressure gas source that is reduced in pressure to a lower pressure gas source as a consequence of driving said turboexpander.

4. The method of claim 3, wherein said source of compressed gas has a first pressure, said lower pressure gas source has a second pressure, and said first and second pressures are substantially the same.

5. The method of claim 3, wherein said source of compressed gas has a first pressure, said lower pressure gas source has a second pressure, and said first and second pressures are substantially different.

6. The method of claim 3, wherein said gas, the compressed gas, the high pressure gas source and said lower pressure gas source comprise the same type of gas.

7. The method of claim 6, wherein said type of gas is natural gas.

8. The method of claim 4, wherein the source of compressed gas, the high pressure gas source and said lower pressure gas source comprise the same type of gas.

9. The method of claim 8, wherein said type of gas is natural gas.

10. The method of claim 1, wherein said gas comprises a hydrocarbon.

11. The method of claim 1, wherein said gas comprises methane, ethane, propane, butane, natural gas, chlorine, propylene, ammonia, ethylene, oxygen, hydrogen, helium, nitrogen, argon, air or compatible combinations thereof.

12. The method of claim 1, wherein said source of liquefied gas comprises liquid natural gas, liquid methane, liquid ethane, liquid propane, liquid butane, liquid chlorine, liquid propylene, liquid ammonia, liquid ethylene, liquid oxygen, liquid hydrogen, liquid helium, liquid nitrogen, liquid argon, liquid air or compatible combinations thereof.

13. The method of claim 3, further comprising heating said high pressure gas source before, or heating said lower pressure gas source after, driving said turboexpander with said high pressure gas source.

14. The method of claim 3, further comprising combining the source of compressed gas with said lower pressure gas source.

15. The method of claim 3, wherein the source of compressed gas and the lower pressure gas source are kept separated.

16. The method of claim 1, wherein said compressor comprises a cryogenic centrifugal compressor.

17. The method of claim 1, further comprising directing at least a portion of the source of compressed gas to the source of liquefied gas to increase or maintain the pressure of said source of liquefied gas.

18. The method of claim 3, further comprising directing at least a portion of the lower pressure gas source to the gas evolved from the source of liquefied gas to increase or maintain the pressure of said source of liquefied gas.

19. The method of claim 1, wherein said gas is evolved in a storage container during or at about the time of transferring the source of liquefied gas from a shipping container to said storage container.

20. The method of claim 19, wherein said shipping container is a ship, a road or rail transport vehicle, or a container transported thereon.

21. The method of claim 3, wherein said high pressure gas source comprises a gas having a pressure of from about 100 psig to about 1,000 psig.

22. The method of claim 3, wherein said lower pressure gas source comprises gas having a pressure of from about 5 psig to about 500 psig.

23. The method of claim 1, wherein said source of compressed gas comprises a gas having a pressure of from about 5 psig to about 250 psig.

24. The method of claim 1, further comprising heating said source of compressed gas before, or heating said compressed gas after, compression by the said compressor.

25. A system for the recovery of gas, said system comprising:

a container for a source of liquefied gas from which gas evolves;

a compressor in communication with an outlet of said container, said outlet enabling the withdrawal of gas from said container, said compressor capable of increasing the pressure of withdrawn gas from the container and forming a source of compressed gas, said compressor including a drive member;

a turboexpander having a drive member; and a drive transmission device for transmitting power from the drive member of said turboexpander to the drive member of said compressor.

26. The system of claim 25, wherein the drive member of the compressor and the drive member of the turboexpander comprise the same drive shaft.

27. The system of claim 25, further comprising a source of liquefied gas in said container and gas in said container evolved from said source of liquefied gas.

28. The system of claim 25, wherein said compressor comprises a cryogenic centrifugal compressor.

29. The system of claim 27, further comprising a compressed gas conduit for carrying away compressed gas produced by the compressor, and a diverter for diverting at least a portion of the compressed gas to the source of liquefied gas.

30. The system of claim 25, further comprising a high pressure gas source in communication with said turboexpander for supplying a source of power in the form of pressurized gas to the turboexpander; and a reduced pressure gas conduit for carrying away a stream of reduced pressure gas produced by expansion of the high pressure gas source by the turboexpander.

31. The system of claim 30, further comprising a communication between said reduced pressure gas conduit and the source of liquefied gas.

32. The system of claim 30, further comprising a compressed gas conduit, in communication with said compressor, for carrying away compressed gas produced by the compressor, and a communication between said reduced pressure gas conduit and the compressed gas conduit.

33. The system of claim 30, further comprising a heat exchanger in communication with said reduced pressure gas conduit.

34. The system of claim 30, further comprising a compressed gas conduit, in communication with said compressor for carrying away compressed gas produced by the compressor, and a heat exchanger in communication with said compressed gas conduit.

35. A method for recovering gas evolved from a liquefied gas, said method comprising:

providing a source of liquefied gas from which gas evolves; and compressing gas that evolves from said source of liquefied gas with a compressor powered entirely by a turboexpander to form a source of compressed gas.

36. The method of claim 35, wherein said compressor has a drive member, said turboexpander has a drive member, and a drive transmission means is provided for transmitting power from the turboexpander drive member to the compressor drive member to thereby drive the compressor.

37. The method of claim 35, wherein said turboexpander is driven by a gas, and is the same type of gas as passing through said compressor.

38. The method of claim 37, wherein said type of gas is natural gas.

* * * * *